United States Patent [19]

Barker et al.

[11] Patent Number: 6,141,659
[45] Date of Patent: Oct. 31, 2000

[54] SYSTEMS, METHODS AND COMPUTER PROGRAM PRODUCTS FOR RETRIEVING DOCUMENTS FROM MULTIPLE DOCUMENT SERVERS VIA A SINGLE CLIENT SESSION

[75] Inventors: Kevin Spencer Barker, Raleigh; Annmarie O'Donnell; David Allen Schell, both of Durham; Beth Taylor Smith, Apex, all of N.C.

[73] Assignee: International Businss Machines Corporation, Armonk, N.Y.

[21] Appl. No.: 09/076,307

[22] Filed: May 12, 1998

[51] Int. Cl.[7] ..................................... G06F 17/30
[52] U.S. Cl. .................. 707/102; 707/100; 707/101; 707/103; 707/513; 707/516
[58] Field of Search .................... 707/100–103, 707/513, 516, 907, 908

[56] References Cited

U.S. PATENT DOCUMENTS

| | | | |
|---|---|---|---|
| 4,821,211 | 4/1989 | Torres | 345/357 |
| 5,715,444 | 2/1998 | Danish et al. | 707/4 |
| 5,842,217 | 11/1998 | Light | 707/101 |
| 5,890,175 | 3/1999 | Wong et al. | 707/505 |
| 5,983,218 | 11/1999 | Syeda-Mahmood | 707/3 |

FOREIGN PATENT DOCUMENTS

| | | | |
|---|---|---|---|
| 60-225981 | 11/1985 | Japan | G06F 15/64 |
| 10240512 | 11/1998 | Japan | G06F 9/06 |

*Primary Examiner*—Hosain T. Alam
*Assistant Examiner*—Jean Bolte Fleurantin
*Attorney, Agent, or Firm*—Myers Bigel Sibley & Sajovec, P.A.; A. Bruce Clay

[57] ABSTRACT

Systems, methods and computer program products are provided for retrieving documents from multiple document servers into a single client session. Search criteria may be entered within one or more search fields displayed within a search template. Each search field is mapped to respective data fields within various document servers to be searched. When a query is entered by a user into a selected search template, records within document servers that contain data fields mapped to each search field are searched for data matching the entered search criteria. A list of documents having an associated record containing data matching the entered search criteria is displayed within the search template. Upon selection of a displayed record, a document associated with a selected record is displayed within a viewer within the client session.

36 Claims, 17 Drawing Sheets

SYSTEMS, METHODS AND COMPUTER PROGRAM PRODUCTS FOR RETRIEVING DOCUMENTS FROM MULTIPLE DOCUMENT SERVERS VIA A SINGLE CLIENT SESSION

FIELD OF THE INVENTION

The present invention relates generally to data processing systems, methods and computer program products and, more particularly, to data processing systems, methods and computer program products for retrieving documents.

BACKGROUND OF THE INVENTION

Users of data processing systems may require access to data contained within multiple document servers. For example, a financial institution may desire to review various types of documents related to a customer, such as checking account records, credit reports, credit card records, and income tax records. Conventionally, similar documents, or documents created with a particular application program, are maintained in respective document servers. Each document server conventionally requires a user interface specific to that document server for enabling end users to retrieve and display documents therefrom. For example, a user desiring a document from document server "A" activates a user interface specifically designed to query document server "A". Utilizing this user interface, an end user performs a query to retrieve the document.

It would be desirable to be able to search for documents contained within multiple document servers using a single, common user interface. Unfortunately, protocols for some document servers may be incompatible with the protocols for other document servers so that cross-searching with a single interface may not be possible, or may be difficult to perform. For example, similar data fields may have different locations within similar records of the same or different document servers. Additionally, similar data fields may contain different data types. Various other differences may exist as well, such as field length. Furthermore, document servers may run under different operating systems. For example, legacy financial information systems may run on mainframe computing systems, while credit report information systems may run on document servers utilizing the Windows NT® operating system.

Conventionally, each document server queried by an end user requires a separate client session on the end user's client machine. This is illustrated schematically in FIG. 1, wherein a client machine contains two active client sessions (client sessions 1 and 2) corresponding with respective document servers A and B. It would be desirable to simplify user access to data contained within multiple document servers by allowing document retrieval and display without requiring separate client sessions in order to search and retrieve documents from each document server.

SUMMARY OF THE INVENTION

In view of the above discussion, it is an object of the present invention to simplify retrieval of documents from multiple document servers.

It is another object of the present invention to enable access and retrieval of documents from multiple document servers via a single client session.

It is another object of the present invention to enable access and retrieval of documents defined with differing index record data fields via a single index value request.

These and other objects of the present invention are provided by systems, methods and computer program products for retrieving documents from multiple document servers via a single client session. Search criteria may be entered within one or more search fields displayed within a search template provided during a client session. Search fields displayed within the search template are mapped to respective data fields within the various document servers to be searched. When a query is entered by an end user into a selected search template, records within multiple document servers are searched for data matching the entered search criteria. A list of documents having an associated record containing data matching the entered search criteria is displayed within the client session. Upon selection of a displayed record, a document associated with a selected record is displayed within a viewer within the client session. Accordingly, separate client sessions for retrieving documents from different document servers is not required. Preferably, a document opened within a viewer according to the present invention can be modified by the end user.

According to another aspect of the present invention, search templates are provided with search fields that enable a user to retrieve and display documents from multiple document servers within a single client session. A list of data fields associated with records (or document types) contained within each of the document servers is created and stored in a template repository. For each data field in the list, information that is stored includes, but may not be limited to: which document server the field exists within; the document type that the field exists within; the type of data contained in the field; the length of the data field; and whether or not the field may be used in a search. Search fields are designated and a map to one or more data fields in the list is created for each designated search field. Additionally, information on how to access the document servers is stored in the template repository.

Search templates according to the present invention may be configurable with respect to the display of results from end user searches. Search templates according to the present invention may also be configurable with respect to end user access.

Search templates according to the present invention are advantageous because a simplified, easy to understand, user interface may be utilized to access information either within a single document server, or across multiple document servers, having different protocols, structures, data types and naming conventions. For example, document servers, with different respective data fields, operating under different respective operating systems may be easily accessed. For example, a document server on an OS/2 operating system may include the field "Month"; a document server on an AIX operating system may include the field "mo"; and a document server on an OS/390 operating system may include the field "mm". Utilizing the present invention, all of the above fields could be mapped to a search field called "month".

The present invention is also advantageous because an end user need not be aware that he or she is actually accessing multiple document servers. An administrator can provide central administration without impact to end users. Topology, configuration and communication formats can all be changed without the end user even knowing. For example, another document server could be added to a search template without an end user becoming aware of the change. Similarly, an administrator utilizing the present invention can add, or change, for scalability, a middle tier server without impact to end users. Additional advantages of the present invention include using generic terms for search fields and column headers without having to modify the document servers themselves.

DETAILED DESCRIPTION OF THE INVENTION

Figure 1:
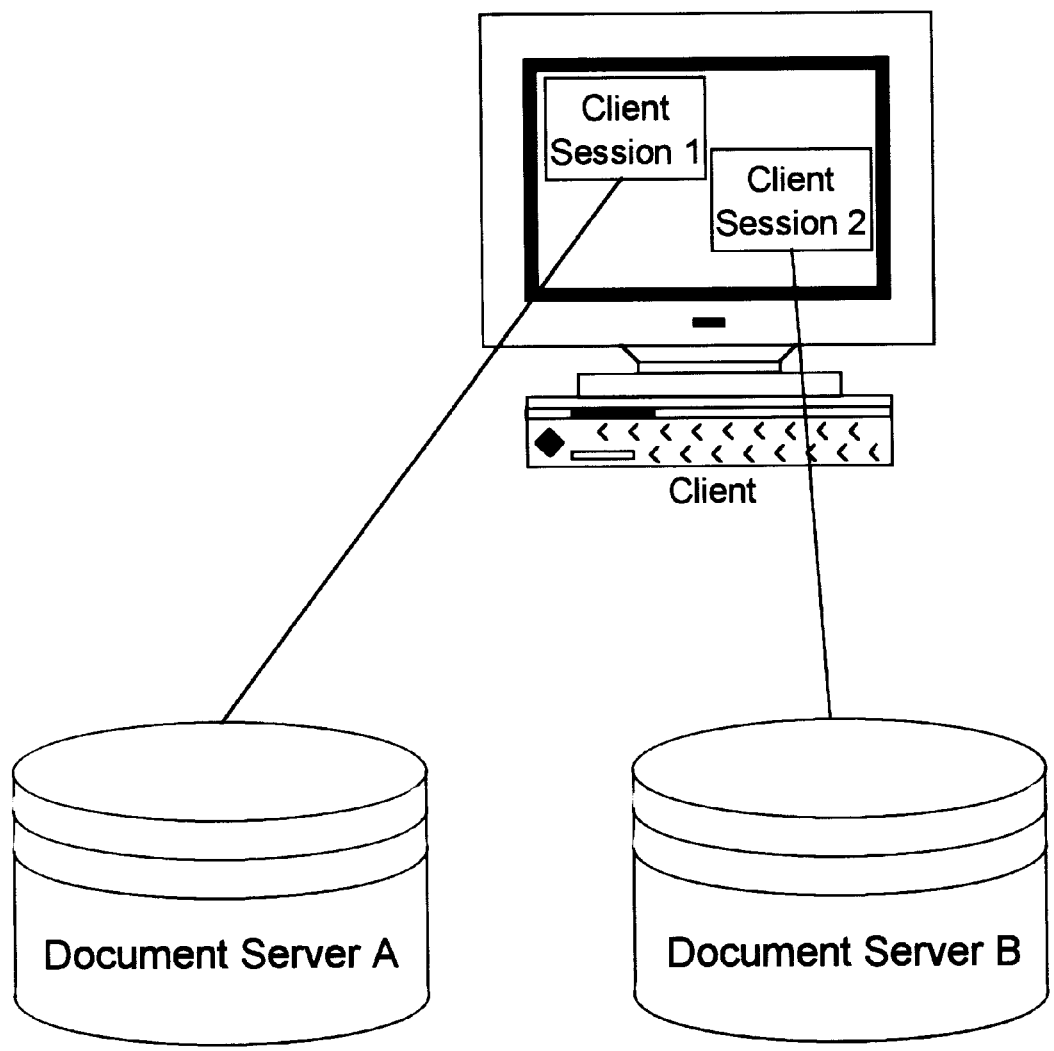
FIG. 1 illustrates a conventional client machine containing two active client sessions for accessing two different document servers.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer code for carrying out operations of the present invention is preferably written in the Java® programming language. However, other object oriented programming languages, such as Smalltalk and C++, may be utilized, as well. In addition, conventional procedural programming languages, such as the "C" programming language, may be utilized. The program code may execute entirely on the user's computer, as a stand-alone software package, or it may execute partly on the user's computer and partly on a remote computer. In the latter scenario, the remote computer may be connected to the user's computer through a LAN or a WAN, or the connection may be made to an external computer (for example, through the Internet using an Internet Service Provider).

The present invention is preferably practiced within a client/server programming environment. As is known by those skilled in this art, client/server is a model for a relationship between two computer programs in which one program, the client, makes a service request from another program, the server, which fulfills the request. Although the client/server model can be used by programs within a single computer, it is more commonly used in a network where computing functions and data can more efficiently be distributed among many client and server programs at different network locations.

Many business applications being written today use the client/server model as does the Internet's main program, TCP/IP. Typically, multiple client programs share the services of a common server program. Both client programs and server programs are often part of a larger program or application. Relative to the Internet, a Web browser is a client program that requests services (the sending of Web pages or files) from a Web server (which technically is called a Hypertext Transport Protocol or HTTP server) in another computer somewhere on the Internet. Similarly, a computer with TCP/IP installed allows client requests for files from File Transfer Protocol (FTP) servers in other computers on the Internet.

As is known to those with skill in this art, client/server environments may include public networks, such as the Internet, and private networks often referred to as "Intranets" and "Extranets." The term "Internet" shall incorporate the terms "Intranet" and "Extranet" and any references to accessing the Internet shall be understood to mean accessing an Intranet and/or and Extranet, as well. The term "computer network" shall incorporate publicly accessible computer networks and private computer networks.

Figure 2:
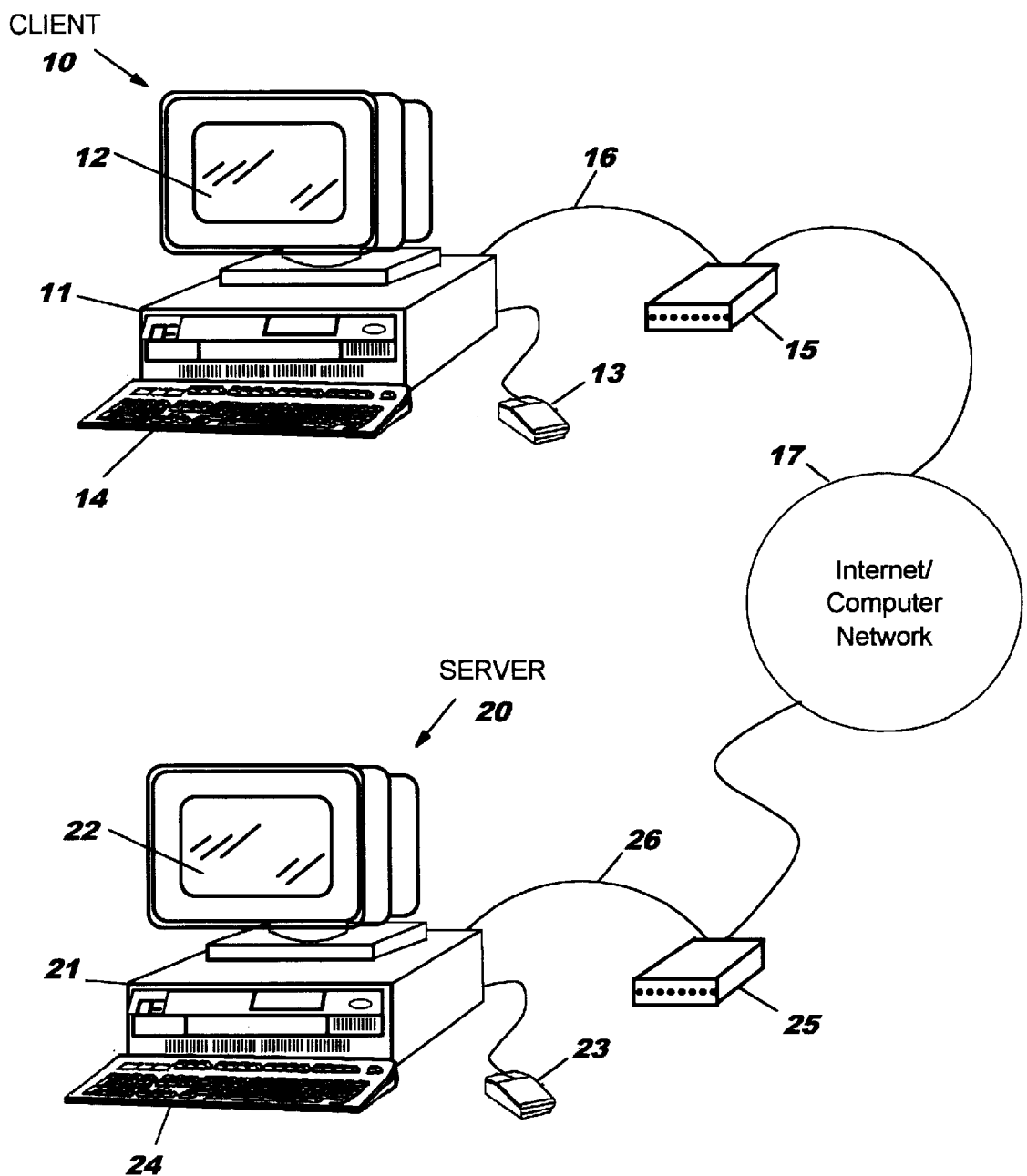
FIG. 2 schematically illustrates a conventional communication structure between a client and a server.

FIG. 2 illustrates a conventional communication structure between a client 10 and a server 20. A client 10 preferably includes a central processing unit 11, a display 12, a pointing device 13, a keyboard 14, access to persistent data storage, and a communications link 16 for communicating with the server 20. The keyboard 14, having a plurality of keys thereon, is in communication with the central processing unit 11. A pointing device 13, such as a mouse, is also connected to the central processing unit 11. The communications link 16 may be established via a modem 15 connected to traditional phone lines, an ISDN link, a T1 link, a T3 link, via cable television, via an ethernet network, and the like. The communications link 16 also may be made by a direct connection of the client 10 to the server 20 or indirectly via a computer network 17, such as the Internet, in communication with the server 20.

The central processing unit 11 contains one or more microprocessors (not shown) or other computational devices and random access memory (not shown) or its functional equivalent, including but not limited to, RAM, FLASHRAM, and VRAM for storing programs therein for processing by the microprocessor(s) or other computational devices. A portion of the random access memory and/or persistent data storage, referred to as "cache," is often utilized during communications between a client 10 and a server 20 to store various data transferred from the server.

Preferably, a client 10 has an Intel® Pentium® processor (or equivalent) with at least thirty-two megabytes (32 MB) of RAM, and at least five megabytes (5 MB) of persistent computer storage 15 for caching. However, it is to be understood that various processors may be utilized to carry out the present invention without being limited to those enumerated herein. Although a color display is preferable, a black and white display or standard broadcast or cable television monitor may be used. A client 10, if an IBM®, or IBM-compatible personal computer, preferably utilizes either a Windows®3.1, Windows 95®, Windows NT®, Unix®, or OS/2® operating system. However, it is to be understood that a terminal not having computational capability, such as an IBM® 3270 terminal or a network computer (NC), or having limited computational capability, such as a network PC (Net PC) may be utilized in accordance with the present invention for accessing a server 20 in a client capacity.

A server 20 may have a configuration similar to that of a client 10 and may include a central processing unit 21, a display 22, a pointing device 23, a keyboard 24, access to persistent data storage 25, and a communications link 26 for connecting to the client 10 via a modem 25, or otherwise. It is preferable that a server have an Intel® Pentium® processor or equivalent, at least sixteen megabytes (32 MB) of RAM, and at least eight hundred megabytes (800 MB) of data storage. However, a server 20 may be implemented using other processors and via other computing devices, including, but not limited to, mainframe computing systems and mini-computers. Document servers are well known to those skilled in this art and need not be described further herein.

It is understood that a client or server or other apparatus configured to execute program code embodied within computer usable media, operates as means for performing the various functions and carries out the methods of the various operations of the present invention.

Figure 3:
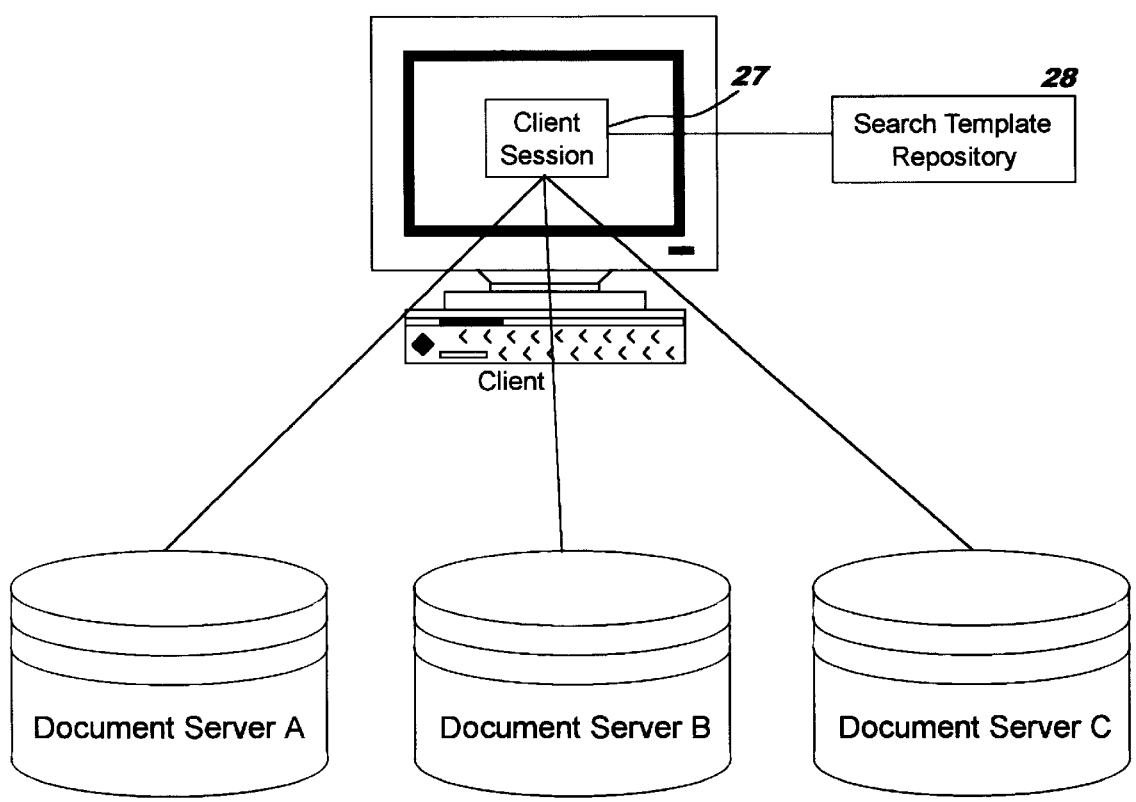
FIG. 3 schematically illustrates a client/server environment according to the present invention wherein documents are retrieved from multiple document servers via a single client session.

Referring now to FIG. 3, a client/server environment is schematically illustrated wherein documents are retrieved from multiple document servers (document servers A, B, C) via a single client session 27. According to the present invention, a search template, described in detail below, is selected by an end user from a search template repository 28. A selected search template allows an end user to search and retrieve documents from multiple document servers without requiring a separate client session for each query.

Figure 4A:
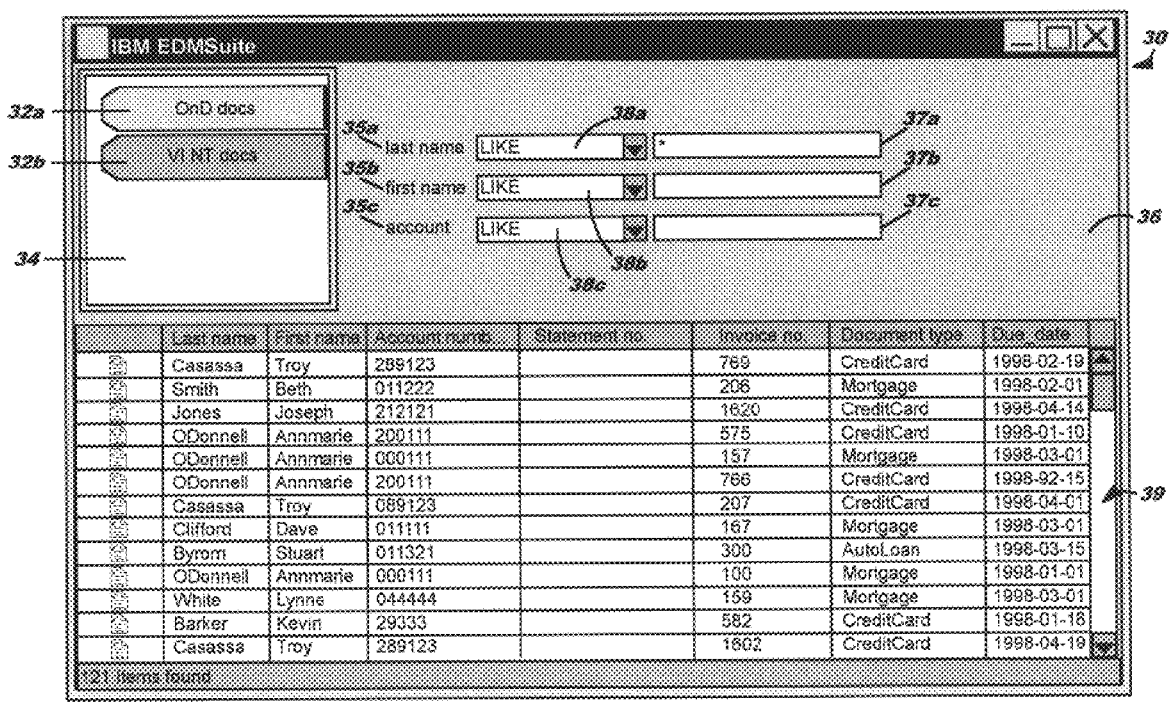
FIG. 4A illustrates a search template for accessing and retrieving documents from multiple document servers, according to the present invention.

Referring now to FIG. 4, a user interface 30, serving as a search template, according to the present invention is illustrated. An end user having authorized access to a search template repository 28 would retrieve the illustrated user interface 30 therefrom to perform various document server searches. For an end user authorized to retrieve the illustrated user interface 30, search templates 32a, 32b available to the end user are listed in box 34. In the illustrated embodiment of FIG. 4, search template 32a is activated. Search fields ("last name", "first name", "account") 35a, 35b, 35c provided with search template 32a are listed in box 36, as illustrated. For each listed search field 35a, 35b, 35c, an end user may enter data to be searched within the various data fields of multiple document servers mapped to the search fields 35a, 35b, 35c. Mapping of data fields to search fields is described in detail below. For each listed search field 35a, 35b, 35c, an end user is also provided with a respective pull down menu box 38a, 38b, 38c containing various comparison operators for creating boolean expressions using the search data entered within boxes 37a, 37b, 37c. Comparison operators and searches utilizing comparison operators and boolean expressions are well known to those skilled in this art and need not be described further herein. The present invention is not limited to the use of comparison operators and boolean expressions. According to additional aspects of the present invention, end users may perform context sensitive searches and full text searches of one or more document servers.

A preferred user interface for performing various document server searches, according to the present invention, is described in a co-pending U.S. Patent Application entitled "Visually Oriented, Easily Navigable Search Facility" (Attorney Docket No. CR9-98-038), filed May 12, 1998, and assigned to International Business Machines, Inc. (IBM), which is incorporated herein by reference in its entirety.

In the illustrated user interface 30 of FIG. 4, an end user has entered the wildcard character "*" within box 37a to indicate that any character (or possibly more than one character) appearing in the data fields mapped to the search term 35a will be considered a successful match. The results of the search, records associated with respective documents, are displayed within box 39, as illustrated. Because the wildcard character "*" was entered within box 37a, all records within multiple document servers containing data fields mapped to the search field 35a ("last name") are listed in box 39. Had the search term "Jones" been entered into box 37a, only records containing a data field mapped to the search field 35a ("last name") and containing the term "Jones" would be displayed in box 39.

Figure 4B:
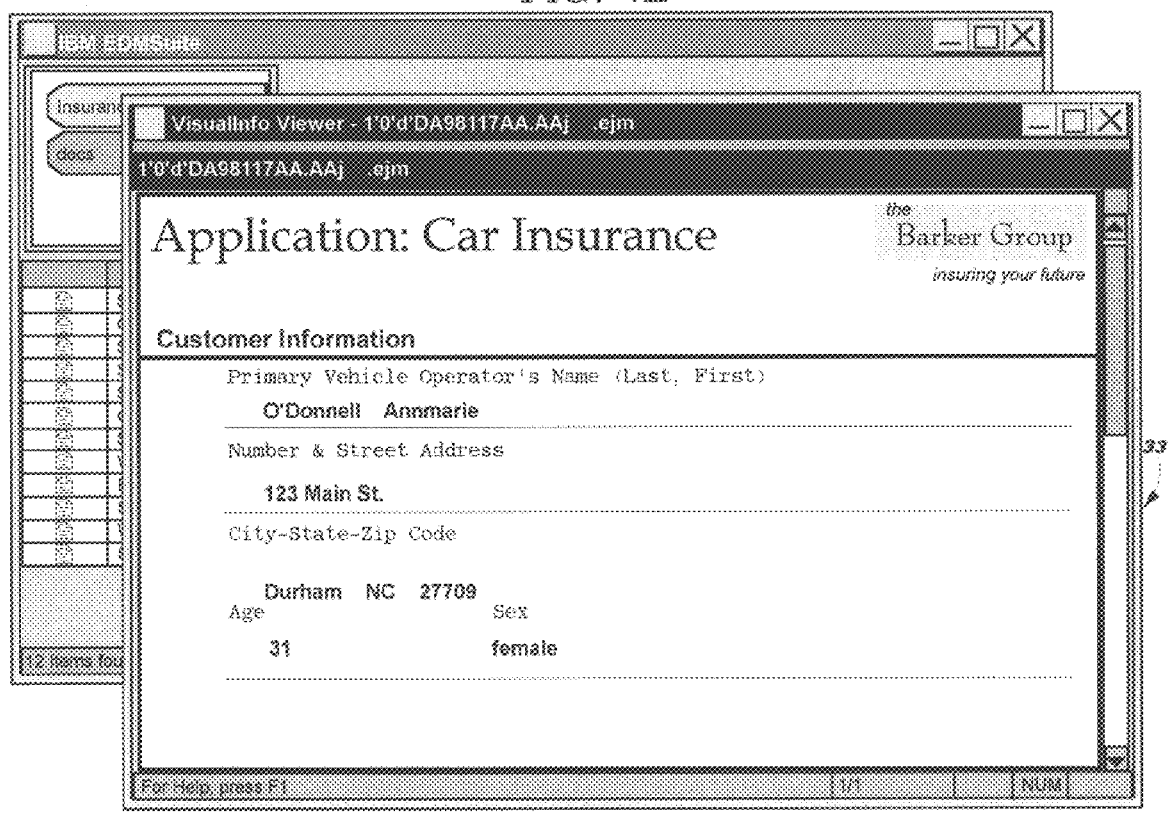
FIG. 4B illustrates an exemplary viewer within which a selected document may be viewed by an end user of the present invention.

An end user may activate any of the records displayed within box 39 to retrieve, within a viewer in the same client session, a document associated with the selected record. FIG. 4B illustrates an exemplary viewer 33 within which a selected document may be retrieved and/or modified.

According to one embodiment of the present invention, an image of a selected document appears in a viewer window of the client session. According to another embodiment of the present invention, an application program in which a selected document was created is launched within a viewer window and the selected document is opened within the application program. This embodiment enables an end user to make modifications to the document. According to a preferred embodiment, a viewer window enables an end user to open a selected document and modify the document without launching the application program in which the selected document was created. As stated above, the viewer may or may not launch the application in which the selected document was created. Also, modifying within the viewer may include things like, annotations, changing the page order or the rotation of the document.

Figure 5A:
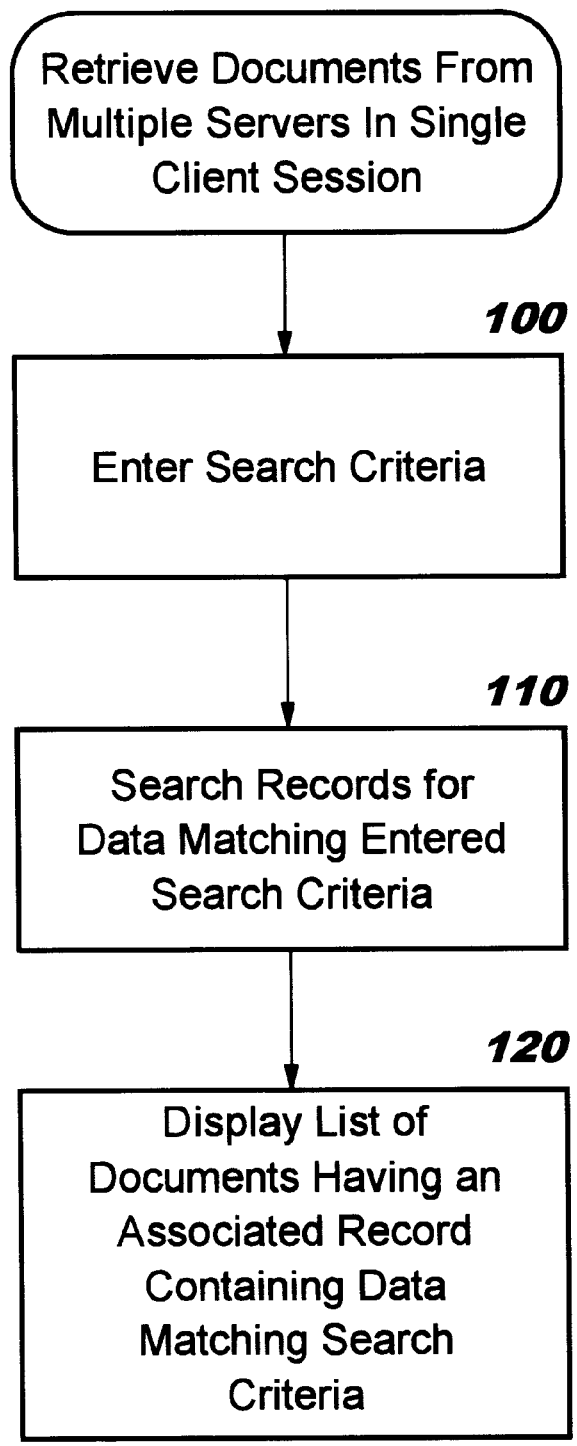
FIG. 5A schematically illustrates operations for retrieving documents from multiple document servers into a single client session, according to the present invention.

Referring now to FIG. 5A, operations for retrieving documents from multiple document servers into a viewer window within a single client session, according to the present invention, are schematically illustrated. Search criteria is entered within one or more search fields displayed within a user interface of search template provided during a client session (Block 100). The search fields within a displayed search template are mapped to respective data fields within multiple document servers. The search fields may be mapped to data fields that contain data of different types. Records within the document servers that contain data fields mapped to each search field are then searched for data matching the entered search criteria (Block 110). A list of end user-selectable documents having an associated record containing data matching the entered search criteria is displayed within a user interface of the search template (Block 120).

Figure 5B:
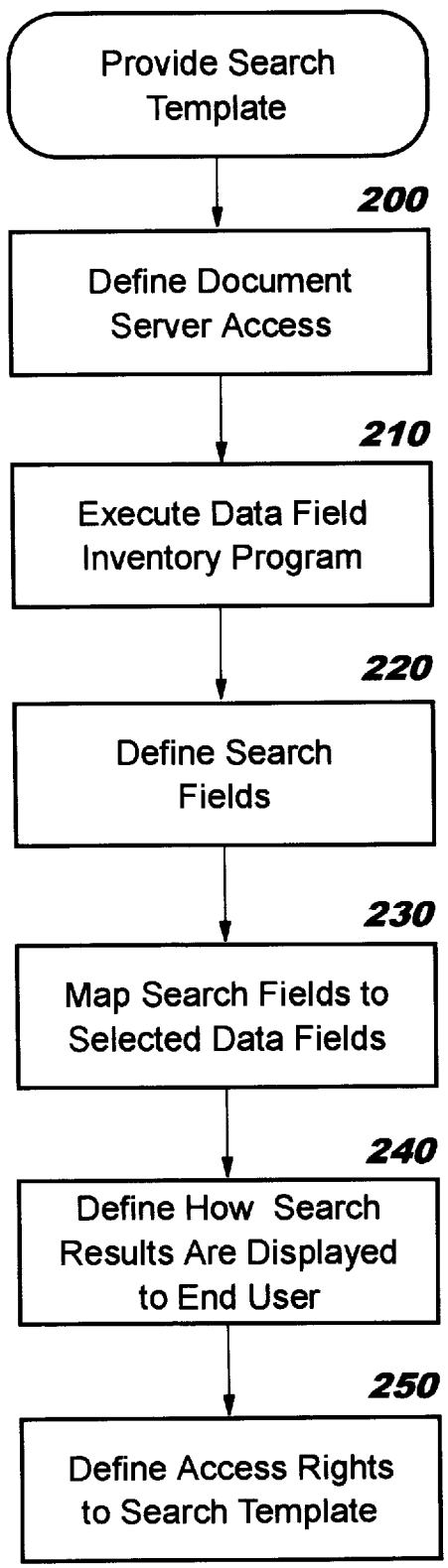
FIG. 5B schematically illustrates operations for providing a search template that enables a user to retrieve and display documents from multiple document servers within a single client session.

Referring now to FIG. 5B, operations for providing a search template that enables a user to retrieve and display documents from multiple document servers within a viewer within a single client session are schematically illustrated. Operations set forth in FIG. 5B may be performed by an administrator authorized to grant access rights to various end users and end user groups. An initial step in providing a search template according to the present invention is to define which document servers are to be searchable (Block 200). Next, a server inventory program is executed that produces a list of all data fields within the document servers defined as accessible in Block 200 (Block 210). Next, for a new or existing search template, search fields are defined or modified (Block 220). The defined search fields are then mapped to selected data fields in the list generated by execution of the server inventory program (Block 230). The administrator then defines how search results are to be displayed to an end user (Block 240) and defines access rights to the search template (Block 250). Various implementations of access rights can be utilized with the present invention. Data access security is preferably left to specific document servers. The present invention utilizes the data access defined by each document server.

Figure 6:
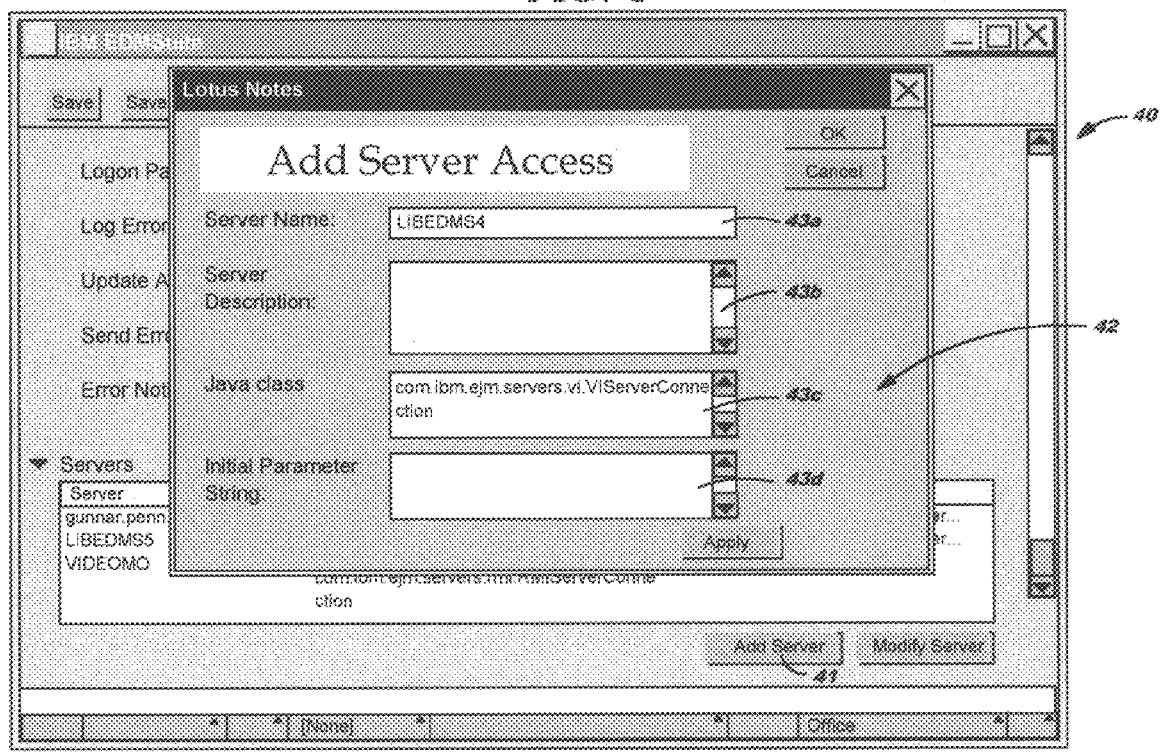
FIG. 6 illustrates a user interface for defining which document servers are accessible for all search templates.

Referring now to FIGS. 6–12, operations for providing a search template that enables an end user to retrieve and display documents from multiple document servers within a single client session are described in detail. In FIG. 6, an administrator is presented with a user interface 40 for defining which document servers will be accessible. When an administrator activates the "Add Server" button 41, an "Add Server Access" panel 42 is produced, as illustrated. An administrator inputs relevant information regarding a respective document server in the provided boxes 43a–43d. For example, server name is input into box 43a, a description of the server is input into box 43b, and a Java® class relevant to the document server is input in box 43c. Additional parameters may be defined in box 43d.

Once information is complete for a specified document server, an administrator can add additional servers or can end the task of adding document servers. In addition, an administrator may utilize the illustrated user interface 40 to modify information about a document server or to remove a document server from the search template. Once all desired document servers have been added to the template repository, a server inventory program is executed to generate a list of all data fields in the document servers defined for the particular search template.

Figure 7A:
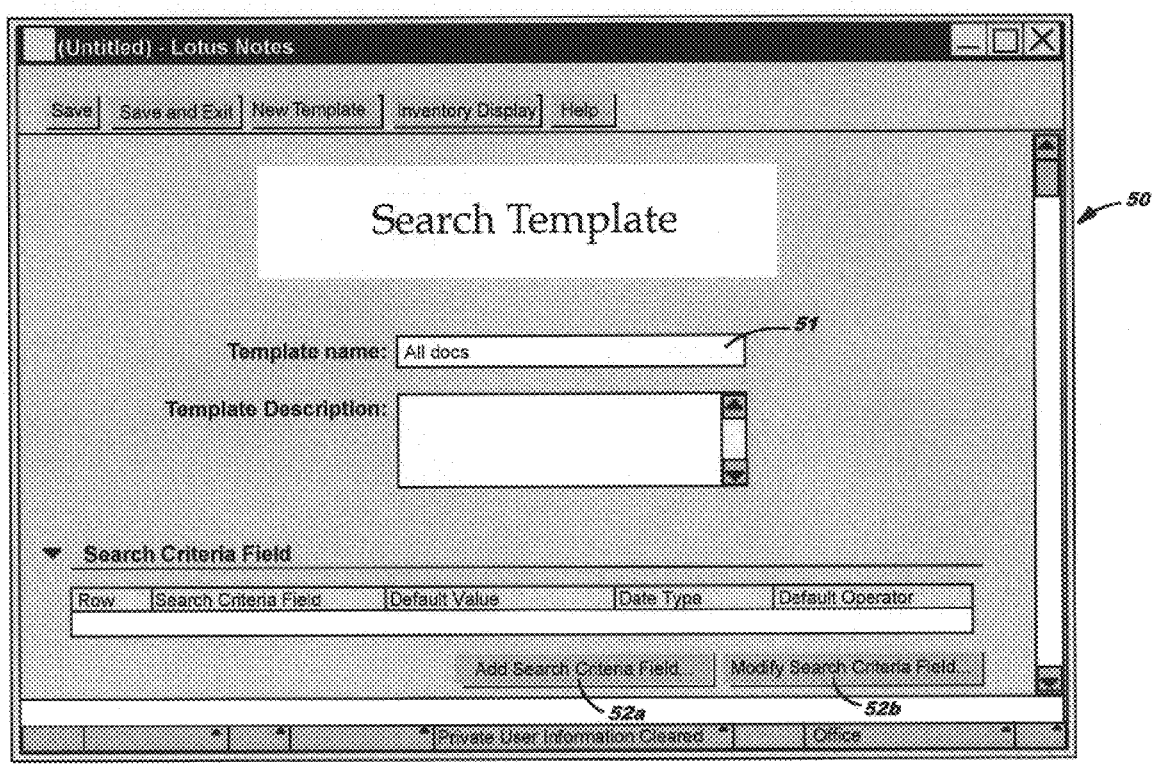
FIG. 7A illustrates a "Search Template" user interface for defining search fields, according to the present invention.

Once the server inventory program has been executed, an administrator defines search fields via a "Search Template" user interface 50 illustrated in FIG. 7A. Each search template is provided with a name via box 51. For example, a search template has been named "All docs" in the illustrated user interface 50. An administrator can add search fields or modify search fields within the search template by activating buttons 52a, 52b, respectively.

Figure 7B:
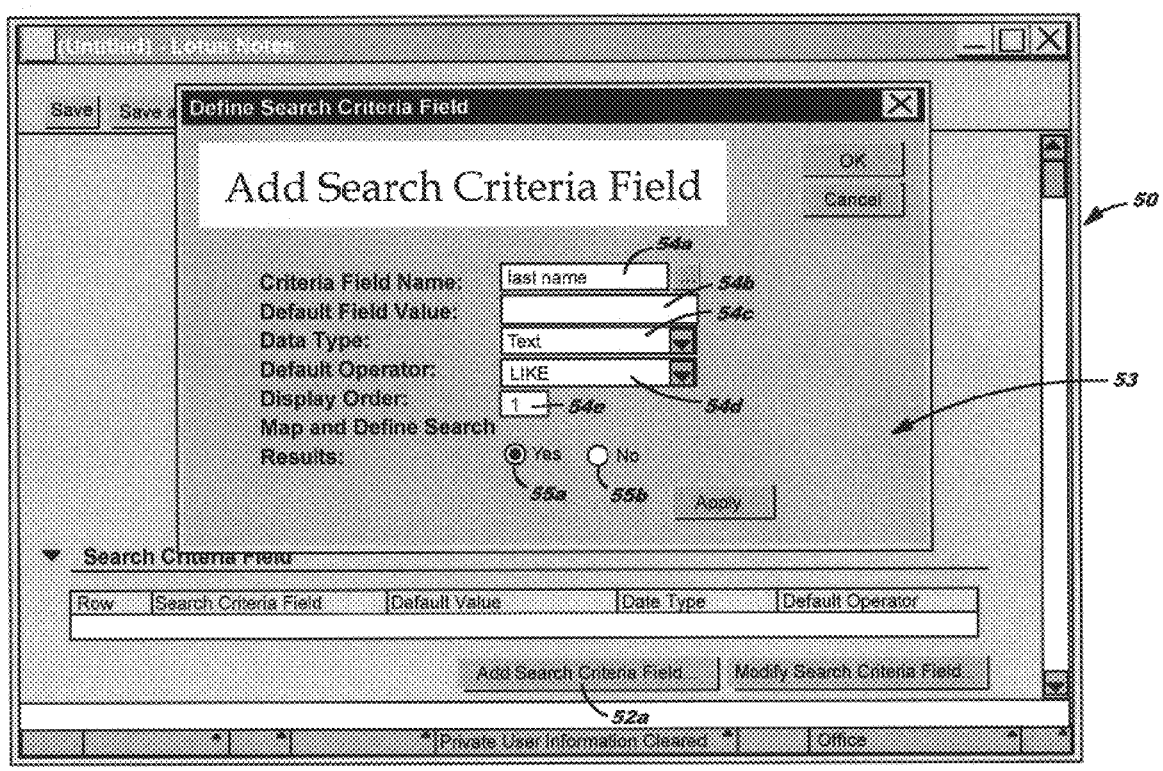
FIG. 7B illustrates an "Add Search Criteria Field" panel for defining search field criteria, according the present invention.

In FIG. 7B, an administrator has activated button 52a and an "Add Search Criteria Field" panel 53 has been produced. Fields that an end user will be allowed to use to generate queries are defined in boxes 54a–54e and radio buttons 55a, 55b. The search fields defined in panel 53 are displayed on the end user interface, for example 35a–35c of FIG. 4. Information that can be defined for each search field includes the name of the search field 54a; the optional default search field value 54b; the data type 54c; the default boolean operator 54d to initially display with the search field; and the order 54e in which a search field is displayed on the end user interface of the search template. An administrator can define as many search fields as desired for a particular search template via panel 53.

Once search fields have been defined, each search field must be mapped to specific occurrences of data fields within the various document servers. An inventory list created via execution of an inventory list program (Block 210, FIG. 5) is used in mapping each search field. The inventory list program retrieves a list of document types (referred to as keyfield groups) and the fields included in each document type. The information that is returned and stored by this inventory list program includes, but may not be limited to, for each field: which document server the field exists within; the document type that the field exists within; the type of data contained in the field; the length of the data field; and whether or not the field may be used in a search. This inventory list program also checks the repository for removed or modified document types and fields.

Figure 8A:
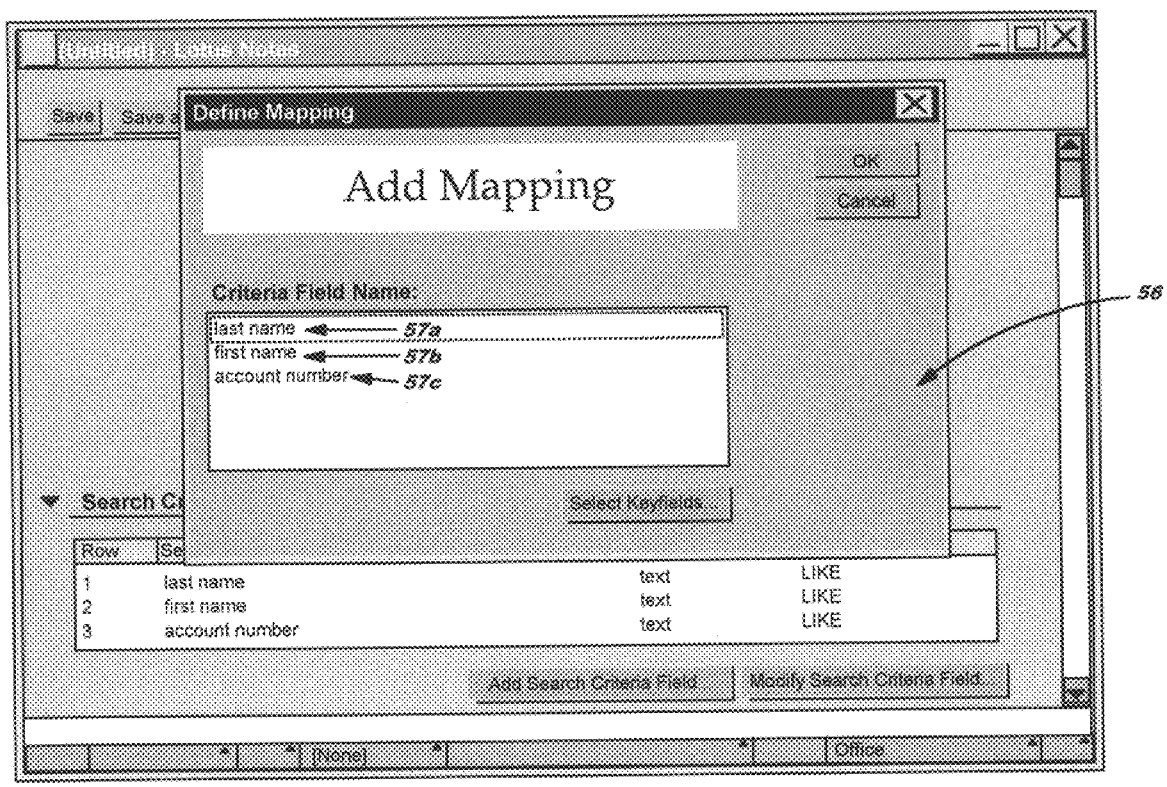
FIGS. 8A–8B illustrate panels for mapping the search fields defined in the "Add Search Criteria Field" panel of FIG. 7B.

Referring to FIG. 8A, an "Add Mapping" panel 56 is illustrated that initiates mapping of the search fields defined in the "Add Search Criteria Field" panel 53. The three illustrated search fields are "last name" 57a, "first name" 57b, and "account number" 57c.

Figure 8B:
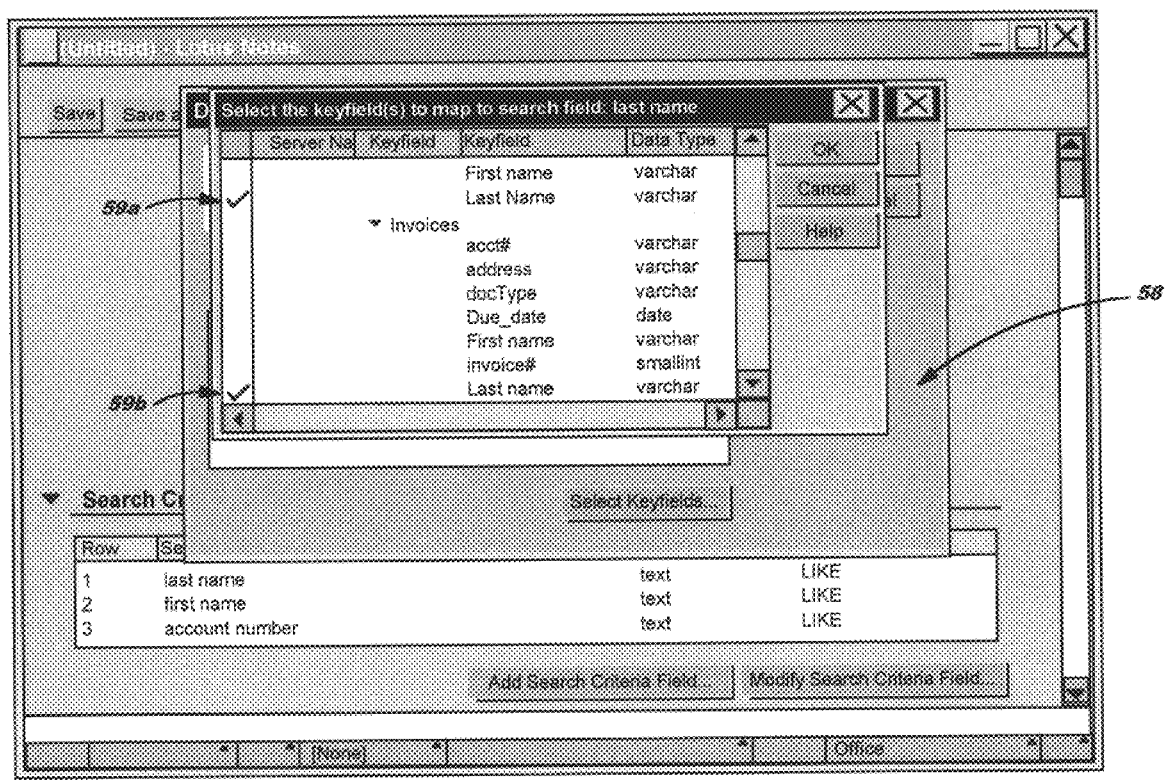

Referring now to FIG. 8B, a mapping panel 58 is produced for the search field "last name". Using the illustrated mapping panel 58, an administrator selects data fields listed in the inventory list to be queried when an end user performs a search of "last name". In the illustrated mapping panel 58, an administrator has selected, via check marks 59a, 59b, data fields from two different document servers that will be queried when a user performs a search via search field "last name". It is understood that an administrator may scroll through a listing of all data fields and document servers via the mapping panel 58 in order to select various data fields from the same and/or different document servers. In addition, an administrator may select a search field that has been previously defined and mapped and include it in a search template.

Figure 9:
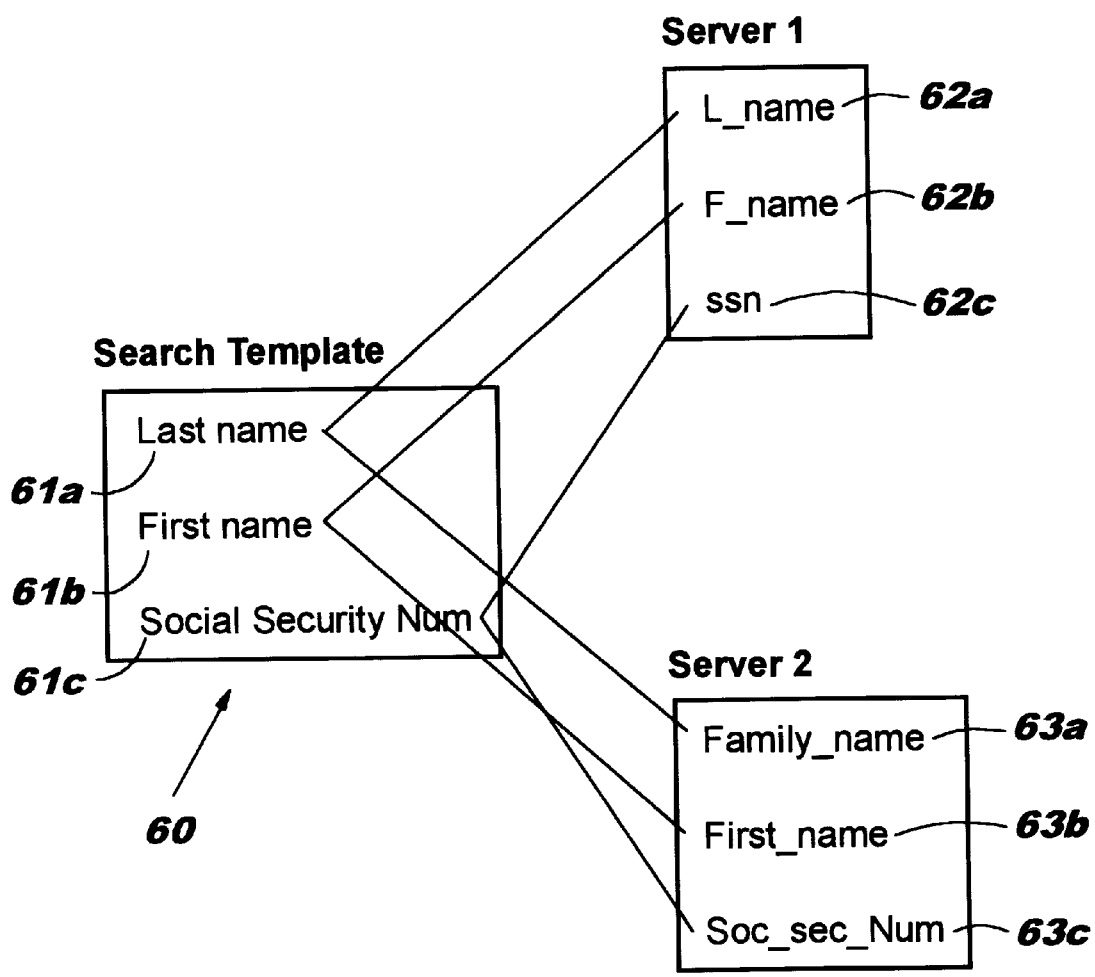
FIG. 9 schematically illustrates mapping a search field to data fields within various document servers.

Referring now to FIG. 9, mapping a search field to data fields within various document servers is illustrated schematically. The illustrated search template 60 includes three search fields: "Last name" 61a, "First name" 61b, and "Social Security Num" 61c. The search field "Last name" 61a is mapped to the data fields "L_name" 62a of document server 1 and "Family_name" 63a of document server 2. The search field "First name" 61b is mapped to the data fields "F_name" 62b of document server 1 and "First name" 63b of document server 2. The search field "Social Security Num" 61c is mapped to the data fields "ssn" 62c of document server 1 and "Soc_Sec_Num" 63c of document server 2. As illustrated, the present invention allows a search field to be mapped to data fields having different names than the search field. It is to be understood that there may not be matches for search fields across all document servers. The lack of a matching search field within a document server does not impact the execution of the present invention.

Figure 10:
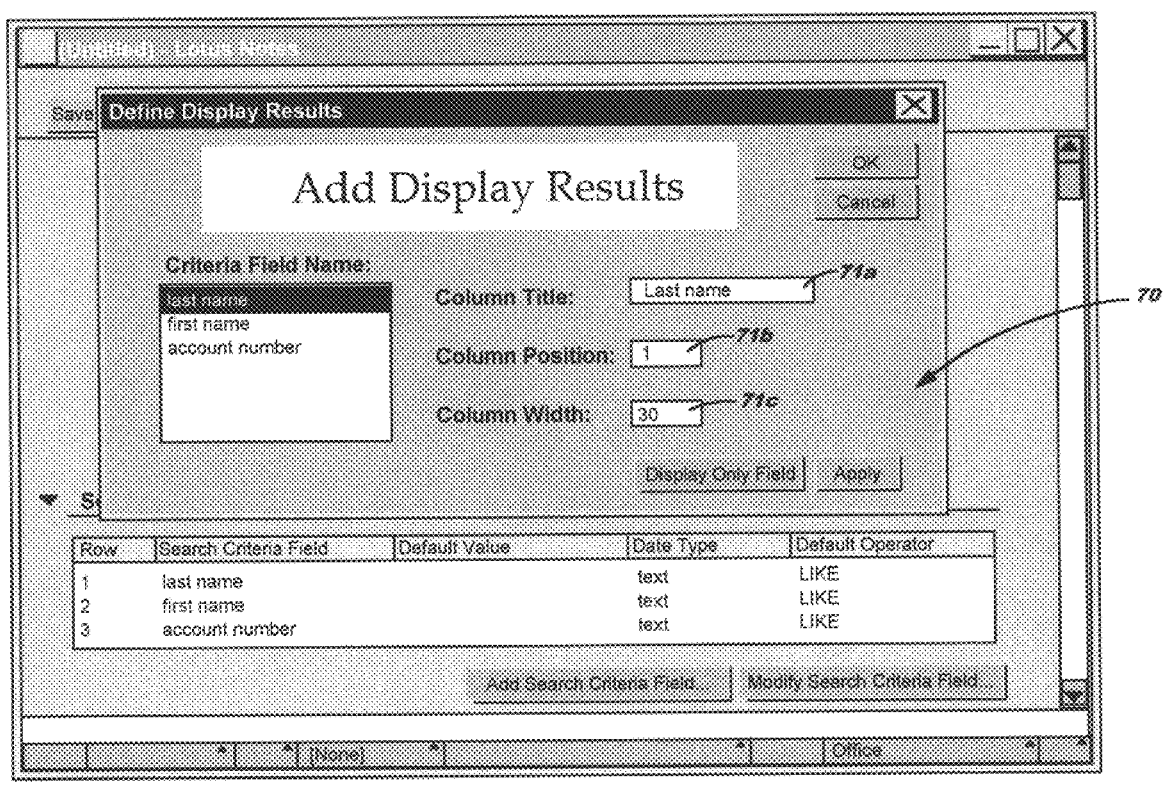
FIG. 10 illustrates an "Add Display Results" panel for configuring how end user query results are displayed to an end user.

Referring now to FIG. 10, an administrator may use the illustrated "Add Display Results" panel 70 to configure how end user query results are displayed to an end user via a particular search template. For example, the query results for the search field "last name" are given the name "Last name" via box 71a, column position 1 via box 71b, and a column width of 30 via box 71c.

Figure 11A:
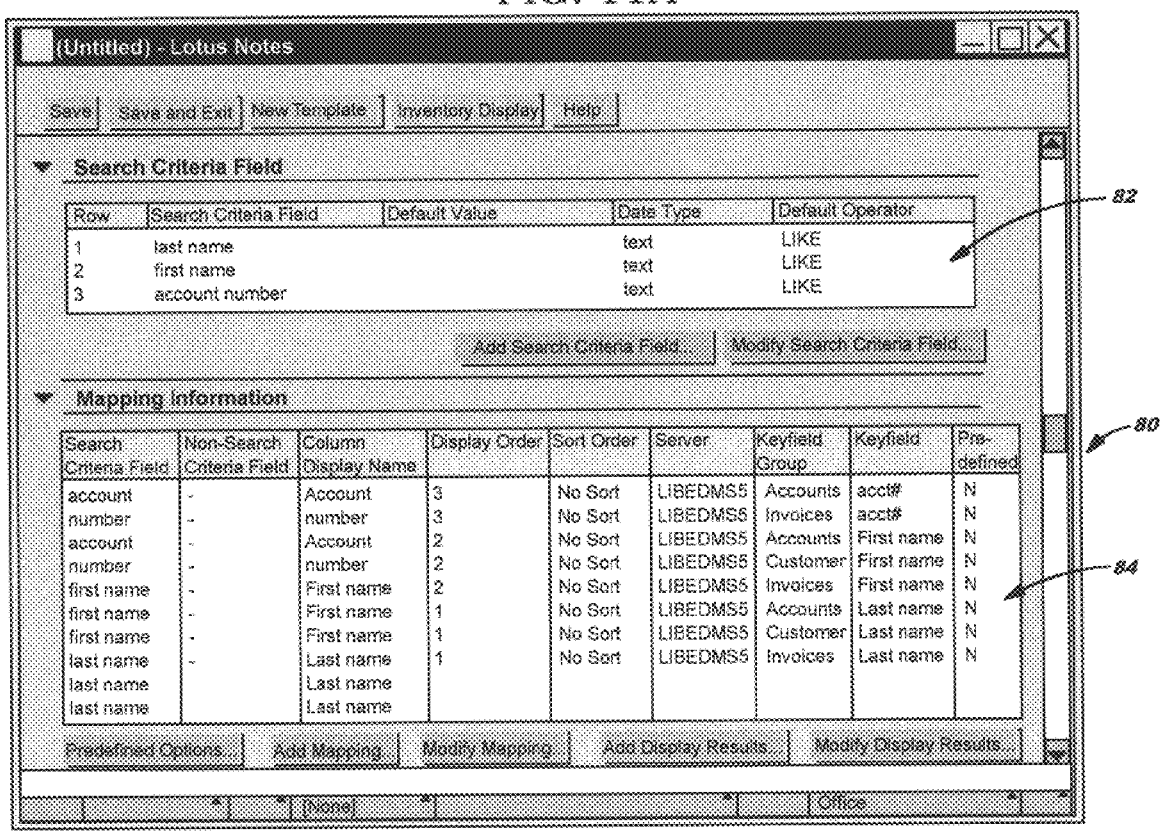
FIG. 11A illustrates mapping and display results for three selected search fields.
Figure 11B:
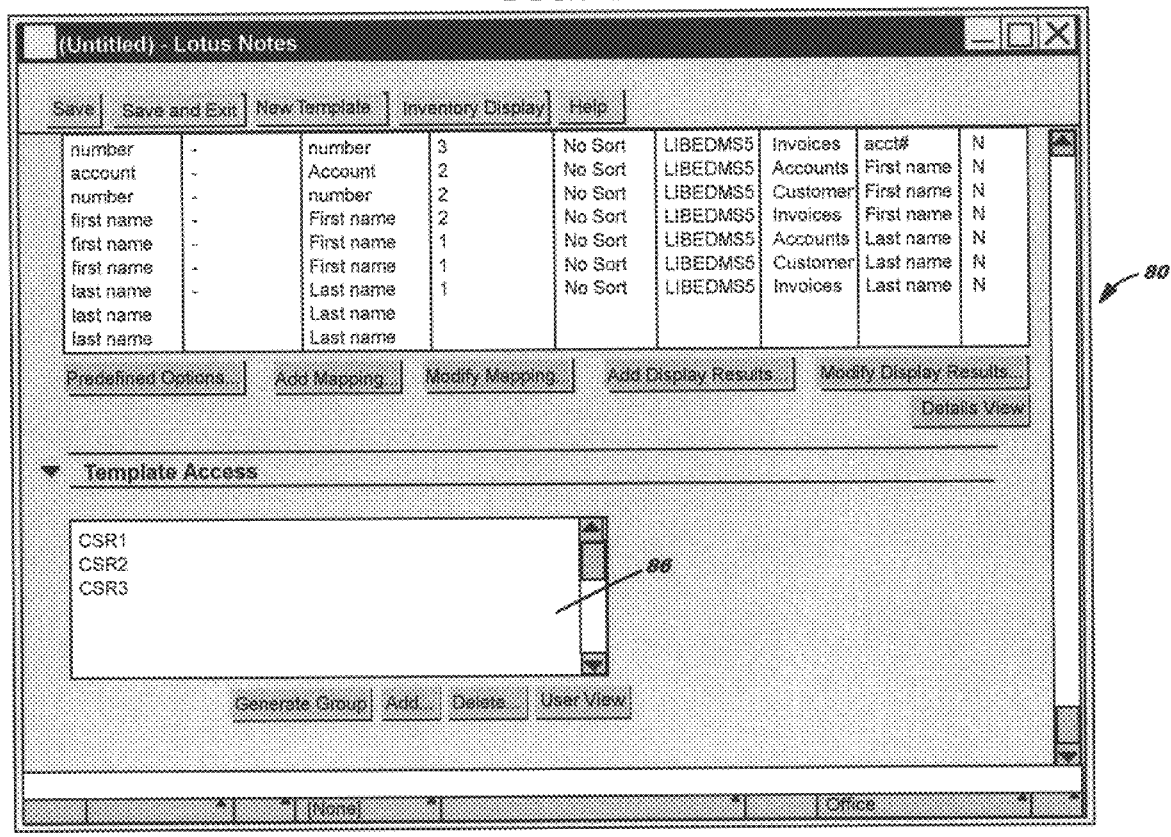
FIG. 11B illustrates assigning end user access to a search template.
Figure 12:
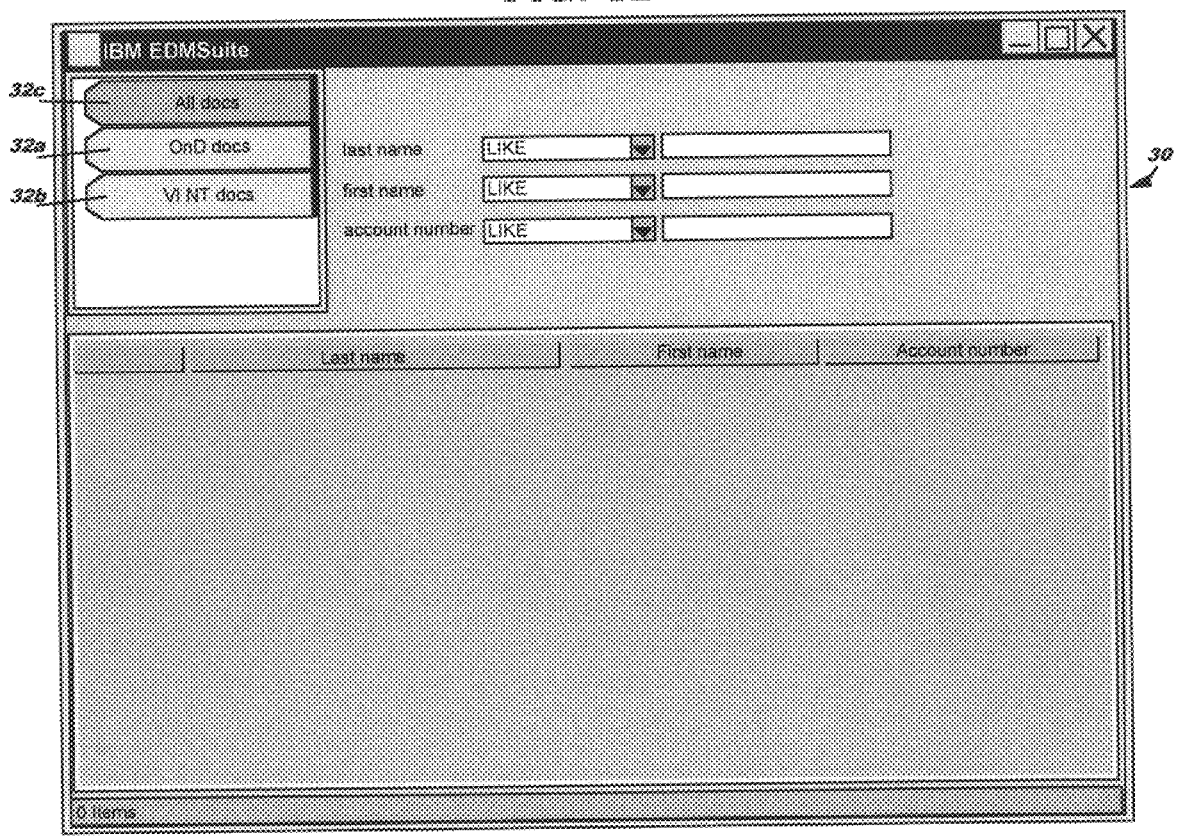
FIG. 12 illustrates a refreshed view of the end user interface of the search template displayed in FIG, 4 showing the added search template "All docs".

Referring now to FIG. 11A, the mapping and display results for the three selected search fields (last name, first name, account number) are illustrated in the user interface 80. Search field information is displayed in box 82 and mapping information for each search field is displayed in box 84. An administrator may assign end user access to each search template via box 86 of the user interface 80, as illustrated in FIG. 11B. End user access may be assigned on an individual basis or a group basis. In the illustrated embodiment, access to the defined search template "All docs" is granted to three groups: CSR1, CSR2, and CSR3. If an end user is not specifically listed in box 86, or is not a member of one of the groups listed in box 86, then that end user will not see the search template on his or her user interface of the search template. Referring now to FIG. 12, a refreshed view of the end user interface 30 of the search template displayed in FIG., 4 is illustrated showing the added search template "All docs" 32c.

It will be understood that each block of the flowchart illustrations of FIGS. 5A–5B and combinations of blocks in the flowchart illustrations of FIGS. 5A–5B, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

The present invention may be utilized in various data processing system environments. For example, queries from an end user's client may be routed such that the queries pass through a middle tier server. A middle tier server could reside on a machine hosting a document server or the middle tier server could be independent of a document server. If a middle tier server is utilized, the application programming interface (API) of each document server may be installed on the middle tier server to allow access to the data stored within each document server.

Alternatively, end user queries may be routed directly to each document server that is to be accessed. If queries are to be routed directly to a document server, a Java Virtual Machine (JVM) is preferably running on each end user's client machine. Also, the application programming interface (API) of each document server is installed on each end user's client machine to allow access to the data stored within each document server.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method of retrieving documents from multiple document servers into a single client session, wherein at least two of the document servers include different application programs, wherein each document server comprises a respective record associated with each document stored therewithin, wherein at least two of the document servers include different records comprising unrelated data fields, the method comprising the steps of:

providing a search template having a search field displayed therein, the search field being mapped to respective unrelated data fields within the document servers;

entering search criteria within the search field;

searching the different records within the document servers that contain the unrelated data fields mapped to the search field for data matching the entered search criteria; and displaying, within the search template, a list of documents associated with the different records containing data matching the entered search criteria.

2. A method according to claim 1 further comprising the step of displaying within a viewer within the client session a document associated with a selected one of the different records, in response to user activation.

3. A method according to claim 2 wherein the step of displaying within the client session a document associated with a selected displayed record comprises launching an application associated with the document within the client session.

4. A method according to claim 1 wherein the document servers operate within different respective operating systems.

5. A method according to claim 1 further comprising the steps of:

modifying a document displayed within the client session; and updating data fields within records associated with the modified document.

6. A method according to claim 5 wherein the step of modifying a document displayed within the client session comprises storing a modification within a document server.

7. A method according to claim 5 further comprising updating data fields within document servers mapped to a data field modified within the client session.

8. A method according to claim 1 wherein the entering step is preceded by the step of selecting the search template from a repository of search templates.

9. A method according to claim 1 wherein the search template comprises features customizable by a user.

10. A method of generating a search template that enables a user to retrieve and display documents from multiple document servers within a single client session, the method comprising the steps of:

creating a list of data fields associated with records contained within each of the document servers, wherein each record is associated with a respective document, and wherein each record comprises a plurality of data fields;

for each data field in the list, storing information on how to access a respective document server;

designating a search field;

creating a map for each search field, each map comprising an identification of data fields in the document servers to be accessed when data is entered into a respective search field; and displaying each search field in a user interface.

11. A method according to claim 10 wherein said step of creating a map comprises:

identifying a location of a data field within a record;

identifying a type of data contained within a data field; and identifying a length of a data field.

12. A method according to claim 10 further comprising the step of defining how to display results from end user searches within the search template.

13. A method according to claim 10 further comprising the step of defining users who can access the search template.

14. A computer program product for retrieving documents from multiple document servers into a single client session, wherein at least two of the document servers include different application programs, wherein each document server comprises a respective record associated with each document stored therewithin, wherein at least two of the document servers include different records comprising unrelated data fields, the computer program product comprising a computer usable storage medium having computer readable program code means embodied in the medium, the computer readable program code means comprising:

computer readable program code means for providing a search template having a search field displayed therein, the search field being mapped to respective unrelated data fields within the document servers;

computer readable program code means for entering search criteria within the search field;

computer readable program code means for searching the different records within the document servers that contain unrelated data fields mapped to the search field for data matching the entered search criteria; and computer readable program code means for displaying, within the search template, a list of documents associated with the different records containing data matching the entered search criteria.

15. A computer program product according to claim 14 further comprising computer readable program code means embodied in the medium for displaying within a viewer within the client session a document associated with a selected one of the different records, in response to user activation.

16. A computer program product according to claim 15 wherein the computer readable program code means for displaying within the client session a document associated with a selected displayed record comprises computer readable program code means for launching an application associated with the document within the client session.

17. A computer program product according to claim 14 wherein the document servers operate within different respective operating systems.

18. A computer program product according to claim 14 further comprising:

computer readable program code means for modifying a document displayed within the client session; and computer readable program code means for updating data fields within records associated with the modified document.

19. A computer program product according to claim 18 wherein the computer readable code means for modifying a document displayed within the client session comprises computer readable code means for storing a modification within a document server.

20. A computer program product according to claim 18 further comprising computer readable program code means for updating data fields within document servers mapped to a data field modified within the client session.

21. A computer program product according to claim 14 further comprising computer readable program code means for customizing search template features.

22. A computer program product for generating a search template that enables a user to retrieve and display documents from multiple document servers within a single client session, the computer program product comprising a computer usable storage medium having computer readable program code means embodied in the medium, the computer readable program code means comprising:

computer readable program code means for creating a list of data fields associated with records contained within each of the document servers, wherein each record is associated with a respective document, and wherein each record comprises a plurality of data fields;

computer readable program code means for storing information on how to access a respective document server, for each data field in the list;

computer readable program code means for designating a search field;

computer readable program code means for creating a map for each search field, each map comprising an identification of data fields in the document servers to be accessed when data is entered into a respective search field; and computer readable program code means for displaying each search field in a user interface.

23. A computer program product according to claim 22 wherein said computer readable program code means for creating a map for each search field comprises:

computer readable program code means for identifying a location of a data field within a record;

computer readable program code means for identifying a type of data contained within a data field; and computer readable program code means for identifying a length of a data field.

24. A computer program product according to claim 22 further comprising computer readable program code means for defining how to display results from end user searches within the search template.

25. A computer program product according to claim 22 further comprising computer readable program code means for defining users who can access the search template.

26. A system for retrieving documents from multiple document servers into a single client session, wherein at least two of the document servers include different application programs, wherein each document server comprises a respective record associated with each document stored therewithin, wherein at least two of the document servers include different record comprising unrelated data fields, the system comprising:

means for providing a search template having a search field displayed therein, the search field being mapped to respective unrelated data fields within the document servers;

means for entering search criteria within the search field;

means for searching the different records within the document servers that contain unrelated data fields mapped to the search field for data matching the entered search criteria; and means for displaying, within the search template, a list of documents associated with the different records containing data matching the entered search criteria.

27. A system according to claim 26 further comprising means for displaying within a viewer within the client session a document associated with a selected one of the different records, in response to user activation.

28. A system according to claim 27 wherein the means for displaying within the client session a document associated with a selected displayed record comprises means for launching an application associated with the document within the client session.

29. A system according to claim 26 wherein the document servers operate within different respective operating systems.

30. A system according to claim 26 further comprising:

means for modifying a document displayed within the client session; and means for updating data fields within records associated with the modified document.

31. A system according to claim 30 further comprising means for updating data fields within document servers mapped to a data field modified within the client session.

32. A system according to claim 26 further comprising means for customizing search template features.

33. A system for generating a search template that enables a user to retrieve and display documents from multiple document servers within a single client session, the system comprising:

means for creating a list of data fields associated with records contained within each of the document servers, wherein each record is associated with a respective document, and wherein each record comprises a plurality of data fields;

means for storing information on how to access a respective document server, for each data field in the list;

means for designating a search field;

means for creating a map for each search field, each map comprising an identification of data fields in the document servers to be accessed when data is entered into a respective search field; and means for displaying each search field in a user interface.

34. A system according to claim 33 wherein said means for creating a map for each search field comprises:

means for identifying a location of a data field within a record;

means for identifying a type of data contained within a data field; and means for identifying a length of a data field.

35. A system according to claim 33 further comprising means for defining how to display results from end user searches within the search template.

36. A system according to claim 33 further comprising means for defining users who can access the search template.

* * * * *